United States Patent [19]

Mayer-Mader et al.

[11] 3,742,075
[45] June 26, 1973

[54] STABILIZED 2,3-DICHLORO-1,3-BUTADIENE

[75] Inventors: Rudolf Mayer-Mader, Cologne; Karl Dinges, Odenthal, both of Germany

[73] Assignee: Bayer Aktiengesellschaft, Leverkusen, Germany

[22] Filed: Mar. 4, 1971

[21] Appl. No.: 121,180

[30] Foreign Application Priority Data
Mar. 25, 1970 Germany.................. P 20 14 382.2

[52] U.S. Cl.......................................... 260/652.5 P
[51] Int. Cl........................ C07c 17/40, C07c 17/42
[58] Field of Search................ 260/652.5 R, 652.5 P

[56] References Cited
UNITED STATES PATENTS

| | | | |
|---|---|---|---|
| 1,965,369 | 7/1934 | Carothers et al............. | 260/652.5 P |
| 3,082,262 | 3/1963 | Scott........................... | 260/652.5 P |
| 2,111,253 | 3/1938 | Stoesser et al............... | 260/652.5 R |

*Primary Examiner*—Howard T. Mars
*Attorney*—Connolly & Hutz

[57] ABSTRACT

This invention relates to the stabilization of monomeric 2,3-dichloro-1,3-butadiene, wherein a piperazine derivative corresponding to the formula:

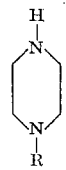

in which R represents hydrogen, a linear of branched alkyl radical with one to five carbon atoms or a linear or branched hydroxyalkyl radical with two to five carbon atoms, is added to the monomer.

4 Claims, No Drawings

STABILIZED 2,3-DICHLORO-1,3-BUTADIENE

This invention relates to the stabilization of 2,3-dichloro-1,3-butadiene with piperazine derivatives.

The monomeric 2,3-dichloro-1,3-butadiene obtainable by known methods (for example G.J.Berchet and W.H.Carothers, J.Am. Chem.Soc. 55, 2,004 to 2,007 (1933) ) shows a very noticeable tendency towards polymerization and is completely polymerized over a period of 24 hours, for example, at room temperature in the presence of air and light (U.S. Pat. specification No. 1,965,369, page 3, lines 19 to 26). Accordingly, considerable difficulties are involved in storing 2,3-dichloro-1,3-butadiene because the monomer can only be prevented from undergoing bulk polymerization at extremely low temperatures. At room temperature, however, it is not long before the formation of polymer product begins, the polymer obtained being completely insoluble in the monomer at room temperature (G.J.Berchet and W.H.Carothers, J.Am.Chem.Soc. 55 (1931), page 2,006, lines 24 to 31).

In order to reduce its tendency towards polymerization, it has been proposed to add to the 2,3-dichloro-1,3-butadiene inhibitors such as, for example, anti-oxidants, e.g. hydroquinone, pyrocatechol, tert.-butyl pyrocatechol, pyrogallol, phenyl $\beta$ -naphthylamine or phenothiazine (cf. for example U.S. Pat. specification No. 1,965,369, page 3, lines 34 to 39). Unfortunately, substances of this kind are unable permanently to inhibit the polymerization of dichlorobutadiene. In addition, it is advisable to store material which has been stabilized in this way at low temperatures in the absence of light and in air-free containers (U.S. Pat. specification No. 1,965,369, page 3, lines 41 to 48). The compounds added as inhibitors have the further disadvantage that, during polymerization of the dichlorobutadiene, they remain to some extent in the polymer following conversion of the monomer. Further, the presence of conventional inhibitors has an adverse effect in cases where the polymer obtained is subjected to further chemical reactions carried out in the presence of radical formers, such as for example bromination as proposed for example in U.S. Pat. specification No. 2,625,373. For example, the addition of bromine to the double bonds is predominantly obtained instead of the required substitution in the allyl position to the double bond (cf. U.S. Pat. specification No. 2,725,373, column 1, lines 65 to 68), in the bromination of 2,3-dichloro-1,3-butadiene stabilized in the usual way, because the stabilizers present act as radical acceptors, thus partly suppressing the allyl bromination taking place through a radical chain mechanism.

It has now been found that monomeric 2,3-dichloro-1,3-butadiene can be effectively stabilized by adding to the monomer a piperazine derivative of the general formula (I):

(I)

in which R represents hydrogen, a linear or branched alkyl radical with one to five carbon atoms or a linear or branched hydroxyalkyl radical with two to five carbon atoms.

The following radicals are mentioned as examples of alkyl radicals containing one to five carbon atoms: methyl, ethyl, propyl, isopropyl, butyl, tert.-butyl, 1-methylpropyl, 2-methylpropyl, pentyl, 1-methylbutyl, 2-methylbutyl, 3-methylbutyl, 1,1-dimethylpropyl, 1,2-dimethylpropyl, 2,2-dimethylpropyl and 3,3-dimethylpropyl.

The following radicals are mentioned as examples of hydroxyalkyl radicals containing two to five carbon atoms: 1-hydroxyethyl, 2-hydroxyethyl, 1-hydroxypropyl, 2-hydroxypropyl, 3-hydroxypropyl, 1-hydroxymethylethyl, 1-hydroxy-1-methylethyl, 1-hydroxybutyl, 2-hydroxybutyl, 3-hydroxybutyl, 4-hydroxybutyl, 1,1-dimethyl-2-hydroxyethyl, 1-hydroxymethylpropyl, 1-methyl-1-hydroxypropyl, 1-methyl-2-hydroxypropyl, 1-methyl-3-hydroxypropyl, 1-hydroxy-2-methylpropyl, 2-methyl-2-hydroxypropyl, 2-hydroxymethylpropyl, 2-methyl-3-hydroxypropyl, 1-hydroxypentyl, 2-hydroxypentyl, 3-hydroxypentyl, 4-hydroxypentyl, 5-hydroxypentyl, 1-methyl-1-hydroxybutyl, 1-methyl-1-hydroxybutyl, 1-methyl-3-hydroxybutyl, 1-methyl-4-hydroxybutyl, 1-hydroxy-2-methylbutyl, 2-methyl-2-hydroxybutyl, 2-hydroxymethylbutyl, 2-methyl-3-hydroxybutyl, 2-methyl-4-hydroxybutyl, 1-hydroxy-3-methylbutyl, 2-hydroxy-3-methylbutyl, 3-hydroxymethylbutyl, 3-methyl-5-hydroxybutyl, 3-methyl-4-hydroxybutyl, 1-hydroxymethyl-1-methylpropyl, 1,1-dimethyl-2-hydroxypropyl, 1,1-dimethyl-3-hydroxypropyl, 1-hydroxy-2-methylpropyl, 1-hydroxy-2-methylpropyl, 1-methyl-2-hydroxymethylpropyl, 1,2-dimethyl-2-hydroxypropyl, 1-hydroxy-2,3-methylpropyl, 2-hydroxymethyl-2-methylpropyl, 3-hydroxymethylbutyl, 3-hydroxy-3-methylbutyl, 2-hydroxy-3-methylbutyl, 1-hydroxymethylbutyl and 1-hydroxy-2,2-dimethylpropyl.

The following piperazines are mentioned as examples of stabilizers for the monomeric 2,3-dichloro-1,3-butadiene corresponding to the general formula (I): piperazine, N-methylpiperazine, N-ethylpiperazine, N-propylpiperazine, N-isopropylpiperazine, N-butylpiperazine, N-tert.-butylpiperazine, N-(methylpropyl)-piperazine, N-(2-methylpropyl)-piperazine, N-(pentyl)-piperazine, N-(1-methylbutyl)-piperazine, N-(2-methylbutyl)-piperazine, N-(3-methylbutyl)-piperazine, N-(1,1,-dimethylpropyl)-piperazine, N-(1,2-dimethylpropyl)-piperazine, N-(2,2-dimethylpropyl)-piperazine, N-(3,3-dimethylpropyl)-piperazine, N-(1-hydroxyethyl)-piperazine. N-(2-hydroxyethyl)-piperazine, N-(1-hydroxypropyl)-piperazine N-(2-hydroxypropyl)-piperazine, N-(3-hydroxypropyl)piperazine, N-(1-hydroxymethylethyl)-piperazine, N-(1-hydroxy-1-methyl-ethyl)-piperazine, N-(1-hydroxybutyl)-piperazine, N-(2-hydroxybutyl)-piperazine, N-(3-hydroxybutyl)-piperazine, N-(4-hydroxybutyl)-piperazine, N-(1,1-dimethyl-2-hydroxyethyl)-piperazine,N-(1-hydroxymethylpropyl)-piperazine, N-(1-methyl-1-hydroxypropyl)-piperazine, N-(1-methyl-2-hydroxypropyl)-piperazine, N-(1-methyl-3-hydroxypropyl)-piperazine, N-(1-hydroxy-2-methylpropyl)-piperazine, N-(2-methyl-2-hydroxypropyl)-piperazine, N-(2-hydroxymethylpropyl)-piperazine, N-(2-methyl-3-hydroxypropyl)-piperazine, N-(1-hydroxypentyl)- piperazine, N-(2-hydroxypentyl)-piperazine, N-(3-hydroxypentyl)-piperazine, N-(4-hydroxypentyl)-piperazine, N-(5-hydroxypentyl)-piperazine, N-1-methyl-1-hydroxybutyl)-piperazine, N-(1-methyl-2-hydroxybutyl)-piperazine, N-(1-methyl-3-hydroxybutyl)-piperazine, N-(1-methyl-4-hydroxybutyl)-piperazine, N-(1-hydroxy-2-methylbutyl)-piperazine, N-(2-methyl-2-hydroxybutyl)-piperazine, N-(2-hydroxymethylbutyl)-piperazine, N-(2-methyl-3-hydroxybutyl)-piperazine, N-(2-methyl-4-hydroxybutyl)-piperazine, N-(1-hydroxy-3-methylbutyl)-piperazine, N-(2-hydroxy-3-methylbutyl)-piperazine, N-(3-hydroxymethylbutyl)-piperazine, N-(3-hydroxymethylbutyl)-piperazine, N-(3-methyl-3-hydroxybutyl)-piperazine, N-(3-methyl-4-hydroxybutyl)-piperazine, N-(1-hydroxymethyl-1-methylpropyl)-piperazine, N-(1,1-dimethyl-2-hydroxypropyl)-piperazine, N-(1,1-dimethyl-3-hydroxypropyl)-piperazine, N-(1-hydroxymethyl-2-methylpropyl)-piperazine, N-(1-hydroxy-2-methylpropyl)-piperazine, N-(1-methyl-2-hydroxymethylpropyl)-piperazine, N-(1,2-dimethyl-2-hydroxypropyl)-piperazine, N-(1-hydroxy-2,3-dimethylpropyl)-piperazine, N-(2-hydroxymethyl-2-methylpropyl)-piperazine, N-(2-hydroxy-3-methylbutyl)-piperazine, N-(3-hydroxymethyl-butyl)-piperazine, N-(3-hydroxy-3-methylbutyl)-piperazine, N-(1-hydroxymethylbutyl)-piperazine, N-(1-hydroxy-2,2-dimethylpropyl)-piperazine.

In general, the process according to the invention is carried out by adding to the freshly prepared 2,3-dichloro-1,3-butadiene from 0.01 to 10 percent, and preferably from 0.1 to 1 percent of the piperazine compound of formula (I), based on 100 parts by weight of the monomer. The piperazine derivative is best added directly to the monomeric 2,3-dichlorobutadiene in liquid form at room temperature and at normal pressure in the presence or abence of the usual monomer stabilizers such as p-tert.-butyl pyrocatechol, phenothiazine, etc.

The product stabilized by the process according to the invention can be stored for an almost unlimited period at room temperature without any evidence of polymer formation. Emulsion polymerization of the monomer thus stabilized is totally unaffected by addition of the stabilizer, and the polymer obtained is free from stabilizer.

The N-substituted piperazines used for the process according to the invention can be obtained by known preparative methods, for example, by blocking one nitrogen atom of the piperazine ring which chloroformic acid ethyl ester and then reacting the second nitrogen atom, for example, in accordance with the following scheme which illustrates the preparation of N-methyl piperazine:

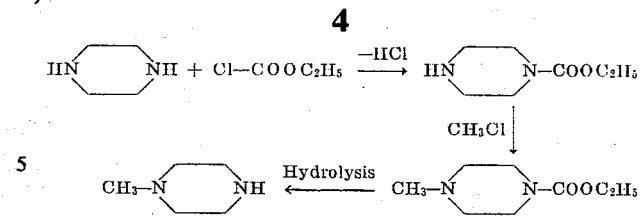

The hydroxyalkyl piperazines of formula (I) are generally obtained by reacting piperazine with alkylene oxides (cf. Kirk-Othmer, Encyclopedia of chem. Technology, second Edition, Vol. 15, John Wiley and Sons, 1968, page 639, lines 24 to 30).

The compounds which can be used in the process according to the invention can of course also be used in conjunction with other conventional inhibitors.

The percentages quoted in the following Example are by weight.

EXAMPLE 1

To measure monomer stability at room temperature, polymeric 2,3-dichloro-1,3-butadiene is freed from all the impurities and additives present in it, especially stabilizers, by distillation in vacuo. 100 g samples of the stabilizer-free material obtained are poured into glass bottles. The piperazine derivatives identified in the first column of Table I are then added in the concentration specified in column 2 of Table I. 10 cc. of stabilized 2,3-dichloro-1,3-butadiene are removed from the sample bottle at the time intervals indicated in the following columns of Table I, and poured into 100 cc of methanol. Where bulk polymerization has taken place, white insoluble polymer particles are formed (identified by the words "polymer formation" in the corresponding column of Table I).

TABLE I

| Stabiliser | Percent | Behaviour of 2,3-dichloro-1,3-butadiene after the following storages periods at room temperature | | | | | | | | | | |
|---|---|---|---|---|---|---|---|---|---|---|---|---|
| | | 0 day | 1 day | 2 days | 3 days | 4 days | 5 days | 10 days | 15 days | 20 days | 25 days | 30 days |
| No stabiliser | | | | (¹) | | | | | | | | |
| Tert.-butyl pyrocatechol (for comparison) | 0.10 / 0.01 | | | | (¹) | (¹) | | | | | | |
| Phenothiazine (for comparison) | 0.10 / 0.01 | | | | (¹) | (¹) | | | | | | |
| N-methyl piperazine | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | No polymer formation. / Do. |
| Piperazine | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | Do. / Do. |
| N-hydroxyethyl piperazine | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | 0.10 / 0.01 | Do. / Do. |

¹ Polymer formation.

Table I shows that a shelf life of at least 30 days can be obtained in cases where N-methyl piperazine, piperazine and N-hydroxyethyl piperazine are used to stabilize 2,3-dichloro-1,3-butadiene, whilst, in the absence of stabilizers, there are signs of polymer formation in the monomeric dichlorobutadiene after only 2 days.

Although, in cases where p-tert.-butyl pyrocatechol and phenothiazine are used, polymer formation in bulk is retarded in relation to the zero sample, there are signs of polymer formation in these cases also, after the dichlorobutadiene has been stired for much shorter periods in comparison with samples of the kind that have been stabilized with compounds of the general formula (I).

EXAMPLE 2

Since it is of importance so far as the subsequent application of polymeric dichlorobutadiene is concerned to know whether the polymer still contains stabilizer, differently stabilized monomeric 2,3-dichloro-1,3-butadiene was polymerized and worked up, and the resulting polymer was brominated as follows in accordance with U.S. Pat. specification No. 2,725,373:

12.3 g of polydichlorobutadiene are introduced into a three-necked flask containing 150 ml of tetrachloromethane. The flask is then rinsed with nitrogen and the mixture is boiled under reflux while stirring until a clear solution is formed. Two solutions are then added dropwise, the first consisting of 7.25 g of bromine dissolved in 20 ml of CCl$_4$ and the second of 0.56 g of tert.-butyl peroxide in 5 ml of CCl$_4$. The period of time elapsing before hydrogen bromide is evolved (incubation period) is noted in Table II.

Allyl bromination was seen to begin at different points in time (incubation period before hydrogen bromide is given off), depending upon the type of stabilizer used. The results are set out in Table II.

TABLE II

| Stabilizer in the monomer Compound | Quantity | Incubation period (mins) |
|---|---|---|
| Phenothiazine | 0.1% | 120 |
| none | | 0–2 |
| N-hydroxyethyl piperazine | 0.1 | 0–2 |
| N-methylpiperazine | 0.1 | 0–2 |

Table II shows that the period of time elapsing before hydrogen bromide is given off (incubation period) in accordance with the following scheme:

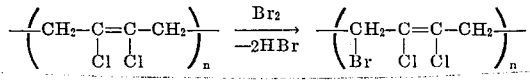

is not delayed in cases where the monomer is stabilized with N-hydroxyethyl piperazine and N-methyl piperazine, whilst, in cases where phenothiazine is used as the stabilizer, the evolution of hydrogen bromide only begins after approximately 120 minutes as an indication of allyl bromination.

What we claim is:

1. A stabilized mixture consisting essentially of 2,3-dichloro-1,3-butadiene and from 0.01 to 10 percent by weight, based on the weight of 2,3-dichloro-1,3-butadiene, of a compound of the formula:

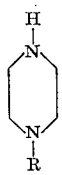

wherein R is hydrogen, a linear or branched alkyl radical having one to five carbon atoms or a linear or branched hydroxyalkyl radical having two to five carbon atoms.

2. The mixture of claim 1 wherein said compound of said formula is present in said mixture in an amount of from 0.1 to 1 percent by weight, based on the weight of 2,3-dichloro-1,3-butadiene.

3. The mixture of claim 1 wherein R is hydroxyethyl.

4. The mixture of claim 1 wherein R is methyl.

* * * * *